United States Patent Office 2,870,057
Patented Jan. 20, 1959

2,870,057

4- OR 5-INDANYL N-METHYL CARBAMATE

Robert J. Hartle, Gibsonia, and Helen I. Thayer, Pittsburgh, Pa., assignors to Gulf Research & Development Company, Pittsburgh, Pa., a corporation of Delaware No Drawing. Application November 26, 1957
Serial No. 698,904

7 Claims. (Cl. 167—30)

This invention relates to the preparation of new chemical compounds and to their use as insecticides.

As is well known in the art, the use of insecticides to combat a great variety of insects is widely practiced. Accordingly, the provision of substances which exhibit toxic properties and which are suitable for use as insecticides fulfills a very real need.

The present invention accomplishes the provision of new chemical compounds possessing toxic properties which advantageously suit them for insecticidal applications.

Furthermore, the present invention provides novel toxicants suitable for use as insecticides in a variety of forms.

The new chemical compounds which we have found to exhibit insecticidal properties are selected from among the group consisting of 4-indanyl N-methylcarbamate and 5-indanyl N-methylcarbamate.

The synthesis of the above compounds may be accomplished by either of two methods which we will designate Method A and Method B.

Method A consists in the preparation of 5-indanyl N-methylcarbamate from methyl isocyanate and 5-indanol (5-hydroxyindane). The methyl isocyanate which is utilized as a reactant is prepared by the method described by Collucci in "Canadian Journal of Research" 23B, p. 111, 1945, and involves the action of sodium azide on acetic anhydride in n-hexyl ether. After preparing a sufficient amount of methyl isocyanate, it is distilled for convenience into cold isopropyl ether to give a solution of known concentration. A solution containing 5-indanol was prepared by dissolving 2.5 grams (0.019 mole) of 5-indanol in 5 cc. of isopropyl ether and the solution chilled in dry ice. After both reactant solutions were prepared, the synthesis of the 5-indanyl N-methylcarbamate proceeded as follows: To the cold indanol solution was added 5 cc. of methyl isocyanate solution (2.03 grams; 0.0356 mole methyl isocyanate). The mixture was sealed in a glass stoppered flask and allowed to stand at room temperature for three days. The evaporation of the solvent left a crystalline solid reaction product. The reaction product was then recrystallized from a n-hexane-benzene solution to yield 1.9 grams (53% yield) of 5-indanyl N-methylcarbamate in the form of fine white needles. Analysis.—Calculated for $C_{11}H_{13}O_2N$: N, 7.33. Found: N, 7.35, 7.38.

Method B: In this method 5-indanyl chloroformate and methyl amine are utilized as the reactants. This is the more preferred method and is carried out as follows: The 5-indanyl chloroformate was prepared according to the procedure of Strain et al. as described in the "Journal of the American Chemical Society," vol. 72, p. 1254, 1950. Utilizing that method, a solution of 70 grams (0.522 mole) of 5-indanol in 500 cc. of benzene was chilled to 5° C. Phosgene was then passed into the solution at such a rate that adsorption of the gas was complete. A total of 70 grams (0.707 mole) of phosgene was added during 1.5 hours. 80.5 grams (0.522 mole) of N,N-diethylaniline was then added dropwise to the mixture with rapid stirring. The temperature was maintained at 4–6° C. during the addition which required one hour. The mixture was stirred for an additional two hours at room temperature and was then washed successively with 500 ml. portions of ice water, cold dilute hydrochloric acid and ice water. The benzene layer was dried over calcium chloride and the solvent was stripped off at reduced pressure. The crude product was vacuum distilled through a 10 inch Vigreux column to yield 80.5 grams (78.5%) of 5-indanyl chloroformate, a colorless liquid having a boiling point of 111° C./5 mm. The second reactant, anhydrous methylamine solution was prepared by dissolving 56 grams (1.8 moles) of anhydrous methylamine in 300 cc. of toluene which was held at —10° C. in a Dry Ice-acetone bath. Having obtained the reactant materials the synthesis of 5-indanyl methylcarbamate proceeded as follows: 60 grams (0.305 mole) of 5-indanyl chloroformate was added dropwise to the methylamine solution over a 30 minute period. Rapid stirring and efficient cooling were required to keep the temperature below —10° C. during this time. The reaction mixture was allowed to warm to room temperature and filtered to remove the amine hydrochloride. The filtrate was washed successively with water, dilute hydrochloric acid and water. The toluene layer was dried and stripped of solvent at reduced pressure. The residual crystalline solid was recrystallized from 275 cc. of cyclohexane to yield 32 grams (55% yield) of 5-indanyl N-methylcarbamate. Analysis.—Calculated for $C_{11}H_{13}O_2N$: N, 7.33. Found: N, 7.40, 7.43.

The 4-indanyl N-methylcarbamate is prepared by either of the two methods described above by utilizing 4-indanol (4-hydroxyindane) in place of the 5-indanol (5-hydroxyindane). These new compounds may be used as insecticides in a variety of applications by incorporating them with an appropriate carrier. The term carrier as used herein includes the various organic solvents and solid diluents which are commonly used in the art. Thus, the new compounds may be used in the form of an insecticidal spray by incorporating them in petroleum base oils such as naphtha or kerosene. The new toxicants are ordinarily not too soluble in the petroleum oils conventionally employed as bases of insecticide compositions but can be readily dissolved when a secondary solvent is used. Only very small amounts of secondary solvents are needed. Among the secondary solvents which may be advantageously used to increase the solubility of the toxicants are alcohols such as ethyl, isopropyl, butyl, ketones such as acetone, methyl ethyl ketone, and aromatic solvents such as toluene, xylene and benzene.

The toxicants of the present invention may also be utilized as insecticidal dusting powders by mixing with them a solid diluent such as wood flour, talc, gypsum, bentonite, kieselguhr, diatomaceous earth and the like.

The insecticidal activity of the new compounds of the invention is illustrated by the specific examples given in the following tables. The tests were conducted on house flies employing the Barnhart tower test, or as it is commonly known, the mist tower method for testing insecticides. The Barnhart spray tower utilized in the test is adapted for the controlled application of a settling mist and consists of a vertical spray tower of two concentric Celluloid cylinders. The dosage of spray is delivered by means of a De Vilbiss artist's air brush as a fine mist. A slide permits the larger droplets to settle for a desired time to form a standard mist. The slide is then moved and the flies which are confined in paper dishes covered with wire screen, are exposed for a time to the standard mist. Sugar water solution is applied to the treated cage and the percent dead is determined 24 hours after treatment. This apparatus is described in detail in the 1941 issue of Soap and Sanitary Chemicals, vol. #7, pp. 105–115.

Table I

| Insecticide | I | II | III |
|---|---|---|---|
| Makeup: | | | |
| 4-indanyl N-methylcarbamate mg | 1,000 | 1,000 | |
| Pyrethrins mg | 50 | | 50 |
| Naphtha ml | 100 | 100 | 100 |
| Kill percent | 99.8 | 80.0 | 68.8 |

Table II

| Insecticide | IV | V | VI | VII | VIII |
|---|---|---|---|---|---|
| Makeup: | | | | | |
| 5-indanyl N-methylcarbamate mg | 1,000 | 1,000 | 500 | | |
| Pyrethrins mg | 50 | | | 50 | |
| Naphtha ml | 95 | 95 | 97.5 | 100 | 95 |
| Ethanol ml | 5 | 5 | 2.5 | | 5 |
| Kill percent | 100 | 95.4 | 84.8 | 48.8 | 3 |

The 4-indanyl and 5-indanyl N-methylcarbamates of the invention may be used in relatively small amounts sufficient to impart substantial toxicity to insecticide compositions containing them. Generally, a sufficient toxicity is obtained when the compounds are used in insecticidal compositions in amounts from about 0.05 to 2% by weight. However, higher proportions up to about 10% by weight may be employed where desirable.

The new compounds may also be used in combination with other natural or synthetic insecticidal materials as shown in Examples I and IV in the above tables.

Resort may be had to such modifications and variations as fall within the spirit of the invention and the scope of the appended claims.

We claim:

1. A carbamate ester selected from the group consisting of 4-indanyl N-methylcarbamate and 5-indanyl N-methylcarbamate.

2. The compound 4-indanyl N-methylcarbamate.

3. The compound 5-indanyl N-methylcarbamate.

4. An insecticide composition comprising a toxic amount of a compound selected from the group consisting of 4-indanyl N-methylcarbamate and 5-indanyl N-methylcarbamate.

5. An insecticide composition comprising a toxic amount of 4-indanyl N-methylcarbamate and a carrier therefor.

6. An insecticide composition comprising a toxic amount of 5-indanyl N-methylcarbamate and a carrier therefor.

7. An insecticide composition comprising from about 0.05 to 2 percent by weight of a compound selected from the group consisting of 4-indanyl N-methylcarbamate and 5-indanyl N-methylcarbamate.

No references cited.

Notice of Adverse Decision in Interference

In Interference No. 92,070 involving Patent No. 2,870,057, R. J. Hartle and H. I. Thayer, 4 or 5 indanyl N-methyl carbamate, final judgment adverse to the patentees was rendered Aug. 7, 1962, as to claims 1 through 7.

[*Official Gazette September 18, 1962.*]